Figure 1:
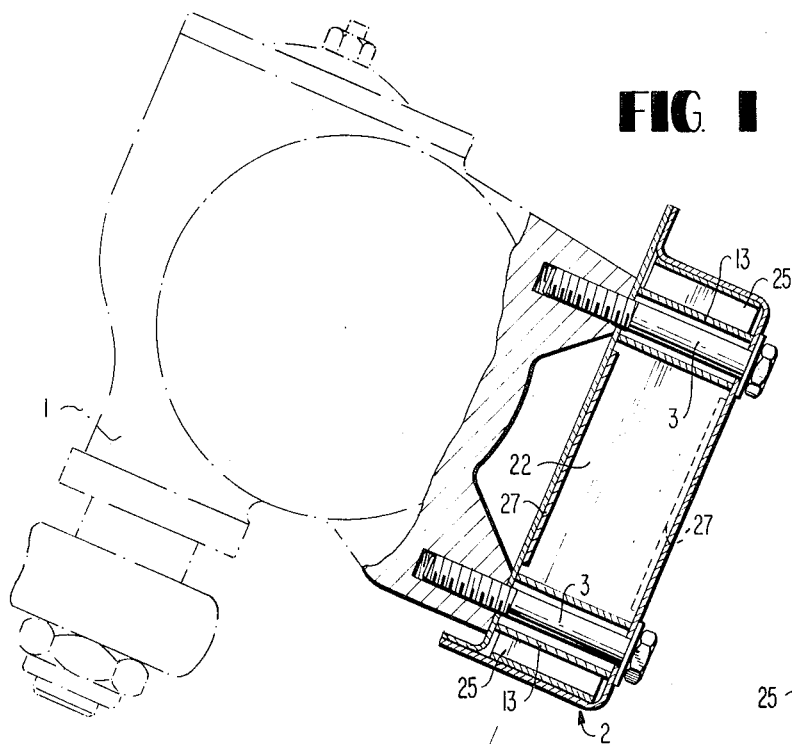

United States Patent [19]
Baur

[11] 3,814,457
[45] June 4, 1974

[54] VEHICLE BODY WITH BOX-SHAPED HOLLOW BEARER

[75] Inventor: Albert Baur, Altingen, Germany

[73] Assignee: Daimler-Benz Aktiengesellschaft, Stuttgart-Unterturkheim, Germany

[22] Filed: Oct. 7, 1971

[21] Appl. No.: 187,277

[30] Foreign Application Priority Data
Oct. 7, 1970  Germany............................ 2049214

[52] U.S. Cl.................... 280/106, 52/731, 280/87
[51] Int. Cl............................................ B62d 25/00
[58] Field of Search................... 280/87, 96, 106 R; 296/28 R; 52/617; 287/189.36, 189.36 D; 16/183

[56] References Cited
UNITED STATES PATENTS

| | | | |
|---|---|---|---|
| 1,543,415 | 6/1925 | Bommer | 16/183 |
| 2,327,585 | 8/1943 | Ulrich | 52/617 |
| 2,389,899 | 11/1945 | Deddo | 287/189.36 C |
| 3,556,552 | 1/1971 | Deckert | 280/106 R |

FOREIGN PATENTS OR APPLICATIONS
1,003,137  9/1965  Great Britain..................... 296/28 R

*Primary Examiner*—Robert G. Sheridan
*Assistant Examiner*—Jerold M. Forsberg
*Attorney, Agent, or Firm*—Craig & Antonelli

[57] ABSTRACT

A vehicle body with a box-shaped hollow bearer, on which is secured a unit, for example, a steering gear, by means of a threaded connection including two fastening bolts extending through the hollow bearer; the hollow bearer is thereby provided within the area of the securing places of the two fastening bolts with a support body internally reinforcing the hollow bearer; the support body, in turn, is reinforced within the area where the fastening bolts extend through the same, by welded-in pipe sections while the support body which may be in the form of a sectional member, has a web that extends substantially along a straight line connecting the axes of the two fastening bolts.

8 Claims, 3 Drawing Figures

PATENTED JUN 4 1974 3,814,457

INVENTOR
ALBERT BAUR

BY Craig, Antonelli & Hill
ATTORNEYS

VEHICLE BODY WITH BOX-SHAPED HOLLOW BEARER

The present invention relates to a vehicle body with a box-shaped hollow bearer, at which is secured an aggregate, for example, a steering gear by means of a threaded connection extending through the hollow bearer, and which within the area of the securing portions of two fastening bolts is provided with a support body lining the same, whereby within the area of the securing bolts also extending through the support body, the latter is reinforced by welded-in pipe section, as described in U.S. Pat. No. 3,556,552.

In the known constructions of this type, a U-shaped profile with spacer tubes has been welded into the hollow bearer. The aim of the present invention is to strengthen the load capacity of the hollow bearer without requiring for that purpose more material than necessary heretofore.

This aim is solved according to the present invention in that the support body made in particular of sectional iron includes a web which extends along the straight line connecting the axes of the fastening bolts. According to a further feature of the present invention, the extensions of the web, which protrude beyond the legs of the sectional member toward both sides, may surround the pipe sections by means of recesses or troughs in an approximately semi-circularly shaped manner and may abut with bent-off end sections at the web wall of the hollow body. Furthermore, the legs of the sectional member may be welded, especially spot-welded to the terminal walls, the troughs to the pipe sections and the end sections to the web walls of the hollow body.

An advantage of the construction of the present invention resides in that no bending moments can occur laterally of the bolts whereby an increased operating strength results. Additionally, a surface loading is achieved in the hollow bearer by the rigid connection of the extensions of the support body with the pipe section as compared to the point loads occurring up to the present. This base body consisting of the sectional member, preferably a Z-section, its extensions and the pipe sections can be constructed more light in weight by reason of its greater load bearing capacity and can be manufactured additionally more simply and more accurately.

Accordingly, it is an object of the present invention to provide a vehicle body with a box-shaped hollow bearer of the type described above which avoids the aforementioned shortcomings and drawbacks encountered heretofore.

Another object of the present invention resides in a box-shaped hollow bearer structure for vehicle bodies which is characterized by greater load bearing capacity without requiring more material than necessary heretofore.

A further object of the present invention resides in a vehicle body with a box-shaped hollow bearer for the attachment of aggregates such as a steering gear, in which no bending moments occur laterally of the fastening bolts.

Still a further object of the present invention resides in a box-shaped bearer for vehicle bodies in which a surface loading is realized.

Another object of the present invention resides in a box-shaped hollow bearer provided with appropriate reinforcement which can be constructed more light-weight, more accurately, and more simply than possible heretofore.

Figure 2:
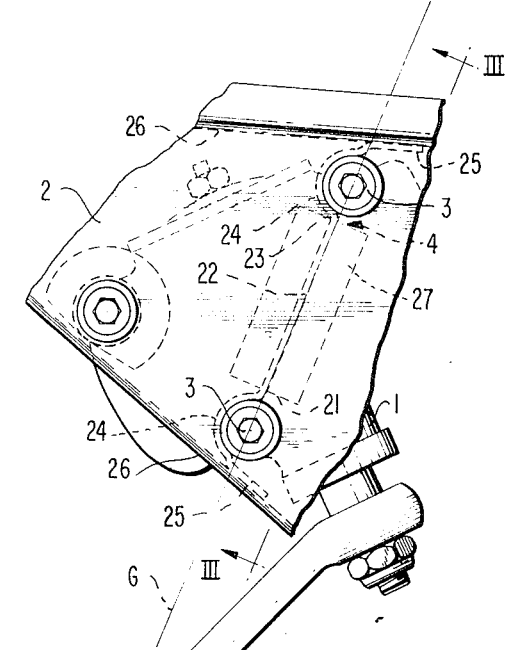
Figure 3:
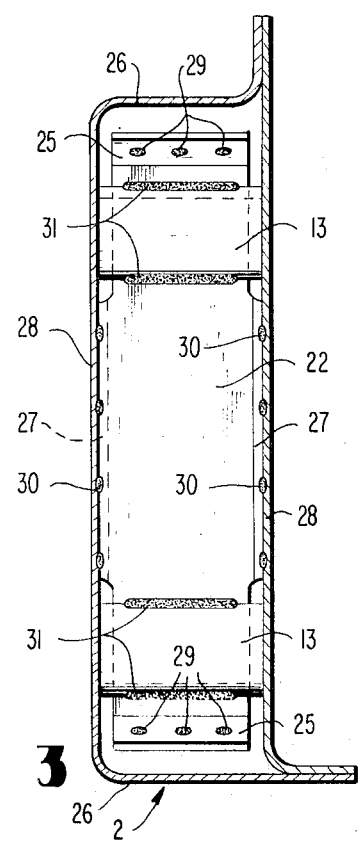

These and other objects, features and advantages of the present invention will become more apparent from the following description when taken in connection with the accompanying drawing which shows, for purposes of illustration only, one embodiment in accordance with the present invention, and wherein FIG. 1 is a cross sectional view through a box-shaped hollow bearer in accordance with the present invention at which a steering gear—shown in dot and dash lines—is threadably connected, FIG. 2 is a partial elevational view of the hollow bearer together with the steering gear, and FIG. 3 is a cross sectional view through the hollow bearer taken along line III—III of FIG. 2.

Referring now to the drawing wherein like reference numerals are used throughout the various views to designate like parts, and more particularly to FIG. 1, the steering gear 1 illustrated in dash and dot lines is secured at the box-shaped hollow bearer generally designated by reference numeral 2 of a vehicle body by means of fastening bolts 3 of which two are located on the straight line G (FIG. 2). These bolts 3 extend through the hollow bearer 2 and are screwed with their external threads in corresponding internally threaded bores of the steering gear 1. For the reinforcement of the securing places within the area of the two fastening bolts 3, which primarily have to absorb the occurring forces, the support body 4 (FIG. 2) is arranged on the inside of the hollow bearer 2. The support body 4 is constituted by a sectional member 21 essentially Z-shaped in cross section, whose web 22 extends along the straight line G (FIG. 2) connecting the axes of the fastening bolts 3. The web 22 is provided on both sides of the Z-shaped sectional member 21 with extensions 23 which are formed, for example, embossed within the area of the pipe sections 13 (FIGS. 1 and 3) into troughs 24 (FIG. 2) which surround the pipe sections 13 approximately in a semi-circular shape. The web extensions continue beyond the recesses 24 on both sides and are provided with corresponding end sections 25. They abut by means of these end sections 25 at the web walls 26 of the box-shaped hollow bearer 2 and are welded in these places to these walls 26. In a similar manner the legs 27 of the Z-shaped sectional member 21 abut at the terminal walls 28 of the hollow bearer 2 and are welded to the same. The welded connections of the end sections and of the leg portions of the support body 4 may be realized appropriately by spot-welding by means of the welding points 29 and 30 whereas the connection of the troughs 24 of the extensions 23 with the pipe sections 13 is realized by longitudinal seams 31 (FIG. 3).

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A vehicle body with a box-shaped hollow bearer means, at which is secured a unit by a threaded connection including two fastening bolts extending through the hollow bearer means and which is provided within the area of the securing places of the two fastening bolts with a support body means, which within the area of the fastening bolts extending through the same is reinforced by welded-in pipe sections, characterized in that the support body means includes a web which is disposed in a plane substantially parallel to and extending through the axes of the fastening bolts, said web having disposed on each end thereof a leg portion substantially perpendicular to said web, said leg portions extending in diametrically opposite directions and being affixed to the hollow bearer means, said web having further means for affixing the web to the hollow bearer means, said further means having portions thereof spaced from the plane extending through the axes of the fastening bolts.

2. A vehicle body according to claim 1, characterized in that the support body means is made from a sectional member.

3. A vehicle body according to claim 1, characterized in that the unit is a steering gear which is secured to the hollow bearer means.

4. A vehicle body according to claim 2, characterized in that said further means comprises extension portions provided on each side of said web, and in that said portions of said further means comprises trough-shaped portions surrounding in an approximately semi-circularly shaped manner the pipe sections said extension portions being further provided with bent-off end sections abutting the web walls of the hollow bearer means.

5. A vehicle body according to claim 4, wherein said leg portions of said web are welded to terminal walls of the hollow bearer means, the trough-shaped portions are welded to the pipe sections and the end sections are welded to the web walls of the hollow bearer means.

6. A vehicle body according to claim 5, characterized in that at least some of said welded connections are spot welded connections.

7. A vehicle body with a box-shaped hollow bearer means, at which is secured a unit by a threaded connection including two fastening bolts extending through the hollow bearer means and which is provided within the area of the securing places of the two fastening bolts with a support body means, which within the area of the fastening bolts extending through the same is reinforced by welded-in pipe sections, characterized in that the support body means includes a web which is disposed in a plane substantially parallel to and extending through the axes of the fastening bolts, said support body means being made from a sectional member, said sectional member including leg portions having extensions projecting toward the two sides beyond the web means, said extensions surrounding in an approximately semi-cricularly shaped manner the pipe sections by means of trough-shaped portions and abutting with bent-off end sections at web walls of the hollow bearer means, the leg portions of the sectional member being welded to terminal walls of the hollow bearer means, the trough-shaped portions being welded to the pipe sections, and the end sections being welded to the web walls of the hollow bearer means, at least some of said welded connections being spot welded connections, and the sectional member is a substantially Z-shaped section.

8. A vehicle body according to claim 7, characterized in that the unit is a steering gear which is secured to the hollow bearer means.

* * * * *